United States Patent [19]

Kobari et al.

[11] 4,333,160
[45] Jun. 1, 1982

[54] MEMORY CONTROL SYSTEM

[75] Inventors: Harukuni Kobari, Yokohama; Yasuhiro Yamada, Fujisawa; Susumu Suzuki; Chitoshi Hibino, both of Yokohama, all of Japan

[73] Assignee: Victor Company of Japan, Ltd., Yokohama, Japan

[21] Appl. No.: 95,553

[22] Filed: Nov. 19, 1979

[30] Foreign Application Priority Data

Nov. 20, 1978 [JP] Japan ............................... 53-143180
Nov. 20, 1978 [JP] Japan ............................... 53-143181

[51] Int. Cl.³ ...................... H04N 5/76; G06F 13/00
[52] U.S. Cl. ................................. 364/900; 358/127; 360/32
[58] Field of Search ... 364/200 MS File, 900 MS File; 358/127; 360/32

[56] References Cited

U.S. PATENT DOCUMENTS 4,138,694 2/1979 Doi et al. ..................... 360/32 X
4,246,615 1/1981 Shiraishi et al. ................ 360/32 X Primary Examiner—Raulfe B. Zache
Attorney, Agent, or Firm—Michael N. Meller; Anthony H. Handal

[57] ABSTRACT

A memory control system comprises a first memory supplied with an incoming modulated digital signal which is formed by subjecting an analog signal to digital signal processing of discontinuous level modulation system, and a first control circuit for supplying a control signal to the first memory. The first control circuit producing the control signal for controlling the first memory in such a manner that the total memory capacity of the first memory is partitioned into a plurality (k) of memory capacity segments having given capacity values (lengths) for use, and the modulated digital signal is written in and further the modulated digital signal thus written in is read out with the order thereof rearranged, interrelatedly with the circulation of addresses through the plurality of divided memory capacity segments while maintaining constant the relationship in terms of capacity values (lengths) between the plurality of divided memory capacity segments.

15 Claims, 18 Drawing Figures

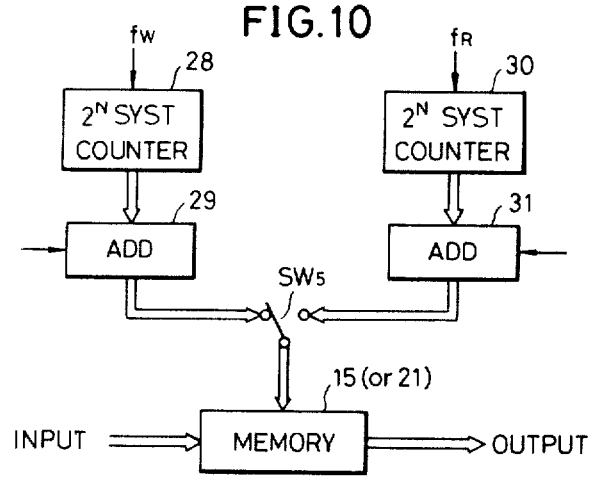

FIG. 16
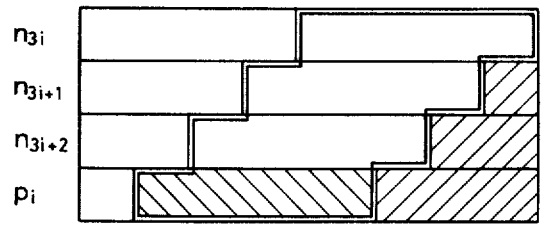
FIG. 17
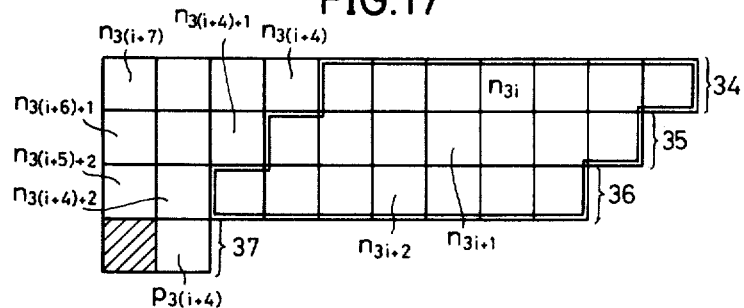
FIG. 18
(A)
| 10 | 9 | 8 | 7 | 6 | 5 | 4 | 3 | 2 | 1 | 0 |
|----|---|---|---|----|----|----|----|----|----|----|
| 20 | 19 | 18 | 17 | 16 | 15 | 14 | 13 | 12 | 11 | |
| 29 | 28 | 27 | 26 | 25 | 24 | 23 | 22 | 21 | | |
| 31 | 30 | | | | | | | | | |
A = 0
A' = 0
(B)
| 11 | 10 | 9 | 8 | 7 | 6 | 5 | 4 | 3 | 2 | 1 |
|----|----|---|---|----|----|----|----|----|----|----|
| 21 | 20 | 19 | 18 | 17 | 16 | 15 | 14 | 13 | 12 | |
| 30 | 29 | 28 | 27 | 26 | 25 | 24 | 23 | 22 | | |
| 0 | 31 | | | | | | | | | |
A = 1
A' = 1

MEMORY CONTROL SYSTEM

BACKGROUND OF THE INVENTION

The present invention relates generally to a memory control systems, and more particularly to a memory control system capable of interleaving digital signals and of restoring the interleaved signals to the original signals, with a memory of minimal capacity.

In known recording and reproducing apparatuses which record and reproduce an analog audio signal, as it is, on and from a traveling magnetic tape by means of a stationary head, there have unavoidably been a number of problems such as wow and flutter of tape travel and noise and distortion arising in the tape and head system. As a natural consequence, these problems impose limitations when it is desired to increase the quality of recording and reproducing audio signals.

Accordingly, a method which comprises converting an analog audio signal into a modulated digital signal (hereinafter referred to simply as "digital signal") by a modulation method such as pulse code modulation (PCM) and recording and reproducing this digital signal is being developed. By this method, problems such as those relating to the S/N ratio distortion due to non-linearity of the recording medium are solved to a considerable degree.

For recording and reproducing this digital signal, recording and reproducing systems of wider frequency band or greater number of channels in comparison with those of a systems for recording and reproducing analog signals are required. Accordingly, for this recording and reproducing apparatus, the use of a so-called video tape recorder (hereinafter referred to as VTR) which has heretofore been widely sold on the market as an apparatus for recording and/or reproducing composite video signals has reached a practical stage. The term "composite video signal" is used in the present specification to designate a signal which results from the addition of synchronizing signals such as a vertical synchronizing signal, equalizing pulses, and a horizontal synchronizing signal to a video information signal. A VTR of this type is capable of recording/reproducing video signals of wide frequency band by means of rotary heads which trace with a relatively high relative tracing speed over oblique tracks on a traveling magnetic tape.

Recording of an audio signal by using this VTR is accomplished by converting the analog audio signal to be recorded into a digital signal, and in an adapter apparatus connected to the VTR inserting this digital signal between synchronizing signals which are the same as the synchronizing signals of an ordinary composite video signal, supplying the composite digital signal thus obtained to the VTR, and recording this signal by means of rotary heads on the magnetic tape. At the time of reproduction, the signal reproduced from the magnetic tape by the rotary heads in the VTR is supplied to the adapter apparatus, where the synchronizing signals are removed, and the resulting digital signal is converted into an analog signal, thereby being restored to the original audio signal.

In the case where dust particles adhere to the surface of the above mentioned magnetic tape, or in the case where there are irregularities in the magnetic material of the tape, a signal loss or dropout occurs in one portion of the reproduced signal. In the case where this occurs, and the reproduction of the most significant bit (MSB), for example, is lost, the signal obtained by decoding will have a considerably large erroneous value. If this signal is converted, as it is, into an analog signal and reproduced, it will be accompanied by a high noise voltage, and the reproduced sound will have an unpleasant quality.

As a countermeasure, there has heretofore been adopted an interleaving system. In a digital signal processing system adopting this interleaving system, the input analog signal is sampled at appropriate periods of time in a sampling and holding circuit, and the resulting sampled signal is converted to a modulated digital signal in an analog to digital (A/D) converter. This modulated digital signal is fed to a memory in which data write-in and read-out operation are controlled by a control pulse, whereby the signal is arranged into a combination of words with the words of the series separated from each other by ten-odd H (H denoting the unit horizontal synchronizing period) to be interleaved with each other. Here, a "unit word" refers to the combination of bits obtained from a single sample. The period of time represented by ten-odd H is determined in conformance with the format.

A composite synchronizing signal is added to the signal thus obtained to produce a composite digital signal, which is then recorded on a magnetic tape by a VTR. This rearrangement of the order of data is referred to as "interleaving". Since the interleaving of data results in distribution of the signal information, even when the recording and reproducing signal is deficient over one or more horizontal scanning (H) periods due to dropout, the associated signal present in the separate horizontal scanning period serves to reproduce the normal information.

A data part is extracted from the signal reproduced from the VTR. This data part, which is waveshaped, is then converted into a binary coded digital signal and thereafter supplied to a memory, where it is written in and read out responsive to a control pulse and is restored to the original order. The resulting signal is supplied to a digital to analog (D/A) converter where it is restored to the original analog signal.

As a memory in the above described recording and reproducing system, there is used a random access memory (RAM) making it possible to conduct the data write-in and read-out operation under control of an external pulse. In order to simplify organization of the memory control system, the total memory capacity of the RAM, which is generally $2^N$ words (where N is a positive integer), has been divided into $2^X$ equal segments, and each equally divided segment having a capacity length of $2^{N-X}$ (all segments are equal) has been allocated for words which are designated by number ho through hy (where, $y \leq 2^X$) and should be time divided and multiplexed within 1H. However, when restoring the interleaving or interleaved data to the original normal order (referred to as "deinterleaving" hereinafter), the capacity values (lengths) of the memory capacity required for the respective data allocated by ho through hy differ from each other, which means that the known memory control system requires rather a large number of memory capacity segments and, as a consequence, is not economical. If the case where $y = 7$ is considered, $2^X$ becomes 8. The data ho is substantially used for deinterleaving, but the part of the capacity length for deinterleaving decreases as the data number increases h1, h2, h3, . . . In the case of h7, no part of the capacity length (corresponding to one eighth of the total memory capacity of memory) is used for deinterleaving. Moreover, as the hatched parts shown for the other data numbers is not required for deinterleaving, there is the disadvantage that about one-half of the total memory capacity is not used effectively.

Moreover, when deinterleaving and jitter elimination processing are carried out simultaneously, the ratio of the non-used part to the total memory capacity of the memory decreases. Furthermore, the non-used memory capacity part increases with an increase in interleaving length.

SUMMARY OF THE INVENTION

Accordingly, it is a general object of the present invention to provide a novel and useful memory control system.

Another and specific object of the present invention is to provide a control system in which the total memory capacity of each of the first and second memories is divided into a plurality of memory capacity segments of given capacity value (length), an address is circulated through the plurality of divided memory capacity segments while maintaining the relationship between the capacity values (lengths) of the plurality of divided memory capacity segments, the input signal is written in the plurality of divided memory capacity segments of the first and second memories and the signal thus written is read out from the same. According to the system of the present invention, a specific delay characteristic can be provided with less waste of the memory capacity segments than in the known system in which the total memory capacity of the first and second memories is divided into a plurality of segments having equal capacity value (length). In this connection, a delay characteristic (the number of data interleaved and deinterleaved within a predetermined period of time) which is equal to that in the known system can be obtained with first and second memories having less total memory capacity than those of the known system. The memories can thus be produced at lower cost. While, in the case of using a memory having the same capacity as that in the known system, the number of data present within a predetermined time period can be increased over the known system, and the memory control can be accomplished by a control system as simple as that of the known system.

Still another object of the present invention is to provide an address control system in which memory capacity parts of equal capacity value (length) for time-axis conversion are further provided inside the plurality of divided memory capacity segments, an address is circulated therethrough while maintaining the relationship between the capacity value of the plurality of divided memory capacity segments, the input signal is written in the plurality of divided memory capacity segments of given capacity value of the first and second memories, and a signal obtained by concurrent rearrangement of the order of the signals obtained by dividing the input signal and time-axis conversion of the input signal is read-out from said plurality of divided memory capacity segments. According to the system of the present invention, when using first and second memories having memory capacities equal to these in the known system, the first memory can carry out interleaving and time axis conversion, and the second memory can carry out such deinterleaving and time axis conversion as jitter elimination, with great increase in the amount of time axis conversion.

Other objects and features of the present invention will become apparent from the following detailed description when read in conjunction with the accompaying drawings.

BRIEF DESCRIPTION OF THE DRAWINGS

In the drawings:

FIGS. 8(A) and 8(B) are diagrammatic views respectively showing how the modulated digital signal within the divided capacity segments changes in interleaving according to the system of the present invention as indicated in FIG. 5;

FIGS. 9(A) and 9(B) are diagrammatic views respectively showing how the address in the divided capacity segments changes in interleaving according to the system of the present invention as indicated in FIG. 5;

FIG. 10 is a block schematic diagram showing an essential part of one embodiment of the system of the present invention;

FIG. 16 is a diagrammatic view showing another example of how the capacity of a memory is divided in the known system;

FIG. 17 is a diagrammatic view showing another example indicating how the capacity of a memory is divided according to the system of the present invention; and FIGS. 18(A) and 18(B) are diagrammatic views showing one example of addresses in the divided memory capacity part of the memory controlled by the system of the present invention.

DETAILED DESCRIPTION OF THE INVENTION

A description is first given of one example of a digital signal recording and reproducing system to which the system of the present invention can be applied.

Figure 1:
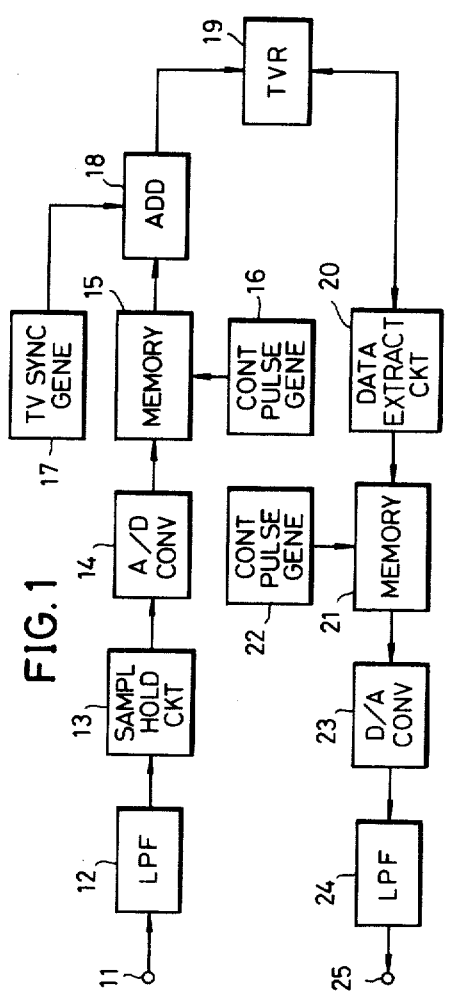
FIG. 1 is a schematic block diagram showing one example of a digital signal recording and reproducing system using a VTR.

Referring to FIG. 1, an analog signal introduced through an input terminal 11 passes through a low-pass filter 12, where the high frequency component thereof is cut off in order to prevent generation of reflected noise, and is then supplied to a sampling and holding circuit 13, where it is sampled at appropriate time intervals. The sampled signal is supplied to an A/D converter 14 which converts it to a modulated digital signal. This modulated digital signal is sent to a memory 15, where data write-in and read-out operations are carried out responsive to a pulse from a control pulse generation circuit 16. The output signal of the memory 15 is supplied to an adder 18 where it is combined with a composite synchronizing signal from a television synchronizing signal generator 17, whereby there is produced a composite digital signal which is then recorded on a magnetic tape by a VTR 19.

Figure 2:
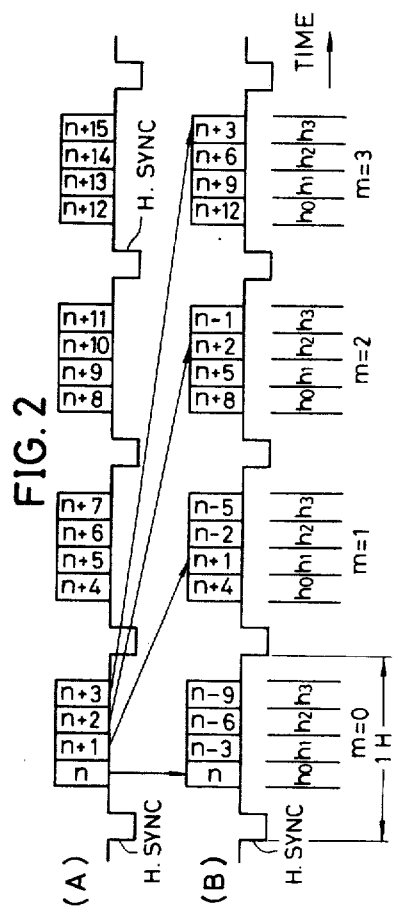
FIGS. 2(A) and 2(B) are signal waveforms indicating how the modulated signals interleave.

The write-in and read-out operation in and from the memory 15 provides a series of words wherein words (data) of the samples are interleaved with each other in conformity with a prescribed format, as indicated in FIGS. 2(A) and 2(B). FIG. 2(A) shows a waveform obtained when the output data of the A/D converter 14 are combined as they are with the composite synchronizing signal. In the same figure, n denotes a datum which is sampled nth and is then subject to A/D conversion, n+1, n+2, ..., n+15 respectively denote data each of which is similarly sampled n+1th, n+2th, ..., n+15th and is then A/D converted. Successively sampled data n, n+1, n+2, ... are rearranged in order so that they exist within different horizontal scanning periods. FIG. 2(B) shows a digital signal in which four data are time-divided and multiplexed at positions h0, h1, h2, and h3 within a unit horizontal scanning period (1H), which four data are respectively expressed as follows, $$\left.\begin{aligned} h0 &= n + 4m \\ h1 &= (n + 1) + 4(m - 1) \\ h2 &= (n + 2) + 4(m - 2) \\ h3 &= (n + 3) + 4(m - 3) \end{aligned}\right\}$$

where, m denotes order of the horizontal scanning period.

Each datum is generally composed of ten and more bits. In the interleaved and continuous data, the positions where data such as n and n+1, n+1 and n+2, and n+2 and n+3 are combined with the composite synchronizing signal differ by about 1H, in the case indicated in FIG. 2(B). In this connection, interleaving of this kind is generally referred to as "interleaving having an interleaving length 1H".

With this interleaving, even when a given horizontal scanning period is lost due to dropout, the series of original data are reproduced from the data in the other data group formed in interleaved arrangement, thus resulting in minimization of signal deterioration due to dropout. The reproduced signal of the VTR contains many burst-like dropouts extending over several Hs in actual practice. This means that the interleaved length should be on the order of ten or more Hs in order to minimize the effect of the burst-like dropout. On the other hand, this, however, requires memories 15 and 21 having large capacity, which makes the system rather expensive.

The digital signal reproduced by the VTR 19 is supplied to a data extraction circuit 20, where the data parts of the signal are extracted. Thus extracted data parts are waveformed and are converted to binary coded digital signals, which are sent to a memory 21. There, data write-in and read-out operations are carried out responsive to pulses from a control pulse generation circuit 22, whereby the data is deinterleaved. Thus the data read out from the memory 21 is in the same order as that of the input data to the memory 15. The resulting data is fed to a D/A converter 23, where it is converted back into the original analog signal. This analog signal passes through a low-pass filter 24 and is led out of an output terminal 25.

Figure 3:
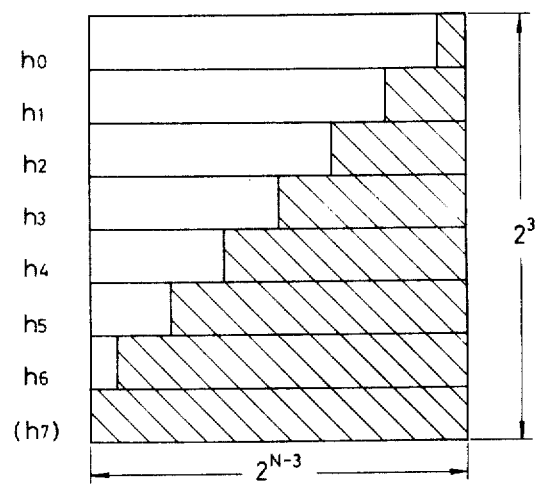
FIG. 3 is a diagrammatic view showing how memory capacity is utilized in interleaving and deinterleaving according to the known system.

In the known memory control system, the memories 15 and 21 have been arranged as described above. That is, for simplifying the organization of the memory control system, the total memory capacity $2^N$ words of the RAM is divided into $2^X$ equal segments each having a capacity length of $2^{N-X}$ (all segments being equal in length) and one segment has been allocated for each of the words which designated by the numbers ho through hy (where, $y \leq 2^X$) and should be time divided and multiplexed within 1H. Consider the case where y=7 and, as a result, $2^X=8$. This is represented in FIG. 3. Only the white rod-like parts are utilized for deinterleaving, while the remaining hatched parts are not utilized for deinterleaving. For example, the capacity length of the hatched part h7 reaches one eigth of the total memory capacity of the memory 21. Thus, the unused part amounts to about one half of the total memory capacity.

Figure 4:
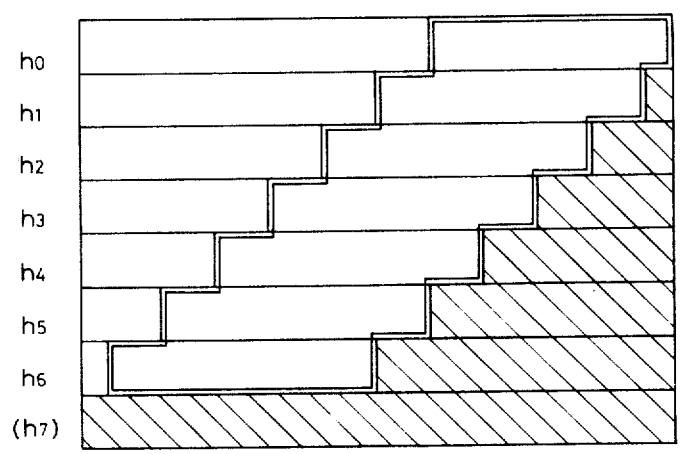
FIG. 4 is a diagrammatic view showing how memory capacity is utilized in concurrent deinterleaving and jitter correcting according to the known system.

Also when carrying out deinterleaving and jitter correction simultaneously, the memory capacity part indicated by hatching in FIG. 4 is not used. In this case, the ratio of the non-used part with respect to the total memory capacity of the memory 21 is even less than in the case shown in FIG. 3. Moreover, the amount of non-used memory capacity increases as the interleaving length increases. The same is also true in the case of the memory 15.

The present invention overcomes the above described disadvantages. Embodiments of the present invention will now be described in reference to FIG. 5 and following drawings.

Figure 5:
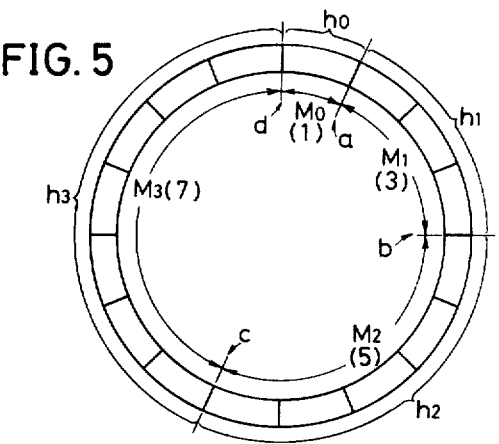
FIG. 5 is a diagrammatic view showing one example of division of memory capacity in interleaving according to the system of the present invention.

FIG. 5 shows one embodiment of the divided state of the memory capacity when interleaving is performed according to the system of the present invention. In the same figure, ho, h1, h2, and h3 respectively denote positions of data which exist within 1H period, as indicated in FIG. 2(B). Numbers in parentheses denote the divided capacity of the RAM having a total memory capacity of 16(=$2^4$). That is, according to the present embodiment, as data which should be present at positions ho, h1, h2, and h3 for interleaving, the total memory capacity of the memory is divided into submemory capacities Mo, M1, M2, and M3 respectively having different lengths of "1", "2", "5", and "7". This division is further made so that division points a, b, c, and d circulate through the memory and carry out data write-in and read-out operation in and from said memory while maintaining the relationship between length of the divided memory capacities in the relationship described above, as will be described further below.

Figure 6:
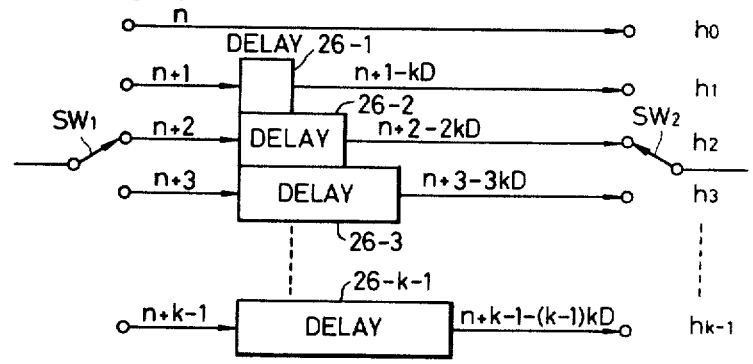
FIG. 6 is a circuit diagram of a basic delay circuit for interleaving a modulated digital signal.

For accomplishing an interleaved data pattern wherein every 1H contains data of k words and the interleaving length is D(H), the circuit arrangement indicated in FIG. 6 is principally used. A switch SW1 which is changed over every specific sampling period and is connected to its associated k contact points is disposed at input side, and another switch SW2 which is changed over in intercoupled operation with the switch SW1 and is connected to its associated k contact points at the output side. Between the input and output switches SW1 and SW2, there are provided delay circuits 26-1, 26-2, 26-3, ..., 26-k-1 respectively for receiving n+1th data, n+2th data, n+3th data, ..., n+k−1th data. The delay circuit 26-1 delays the input data by kD, and the delay circuit 26-2, 26-3, ..., 26-k-1 respectively delay the input data by 2kD, 3kD, ..., (k−1)·kD. The parameter k is the number of data to be placed within 1H.

Figure 7:
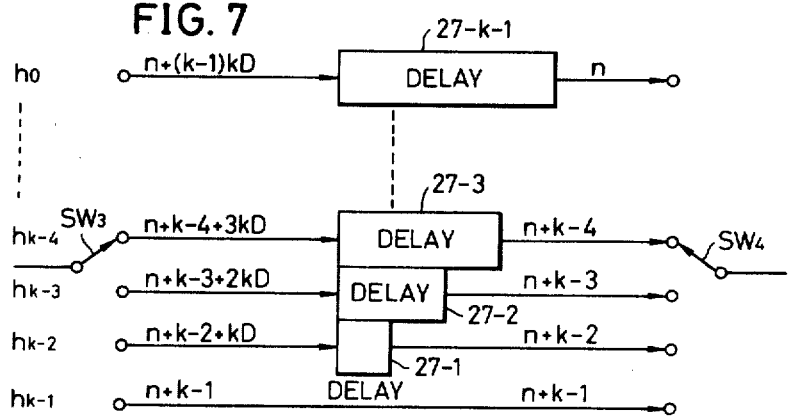
FIG. 7 is a circuit diagram of a basic delay circuit for deinterleaving a signal interleaved.

For restoring the data interleaved as described above to the original arrangement, the circuit indicated in FIG. 7 is principally used. Switches SW3 and SW4, both of which are changed over every specific sampling period and are connected to their associated k contact points, are respectively disposed at the input side and the output side. Between the input and output switches SW3 and SW4, there are provided, in parallel connection, delay circuits 27-k−1, ... 27-3, 27-2, and 27-1 respectively having delay time of (k−1)·kD, ..., 3kD, 2kD, and kD. The data introduced successively are thereby delayed and led out, and (n+k−1)th data is led out without delay. Accordingly, data rearranged to the original order is successively delivered through the switch SW4.

In the above fundamental circuit arrangement, the delay time of the delay circuits 26-1 through 26-k−1 differs from that of the corresponding delay circuits 27-1 through 27-k−1. In this connection, when fabricating the above fundamental circuit arrangement for interleaving and deinterleaving, the total memory capacity $2^N$ of the RAM may be divided into memory capacity segments having different lengths corresponding to the delay time. Accordingly, the data write-in and read-out control system in the memory can be fabricated in a simple arrangement and with minimal memory capacity.

Here, for the sake of facilitating understanding, a description is given of a simple example where k is four words and D is 2H. In this case, the memory capacity segments Mo, M1, M2, M3 at positions ho, h1, h2, h3 respectively becomes 0, 2, 4, and 6. Here, since the RAM has a total memory capacity of $2^N$ (words), the memory capacity nearest to $\Sigma Mi = 12$, that is, 16 ($=2^4$) is selected. The diagrammatic view in FIG. 5 shows an embodiment in which the total memory capacity of 16 is divided into memory capacity segments Mo=1, M1=3, M2=5, and M3=7.

Even in the case where Mo=0, M1=2, M2=4, and M3=6, the above described interleaving and deinterleaving system can also be achieved provided that the write-in operation follows the read-out operation for the data having the same address, and the data at the position ho is led out as it is without passing through the memory.

In the memory 15 (which is the RAM in this embodiment) the memory capacity is divided to segments as indicated in FIG. 5, each divided memory capacity segment, and the data to be written in and read out in and from the segment have a relationship as indicated in FIGS. 8(A) and 8(B). In both figures, the area enclosed by solid lines represents the memory capacity segments used for the interleaving by the system of the present invention. The known system requires the area enclosed by broken lines, in addition to the area described above. In the embodiment in FIG. 8(A), the data n−3 and n−7 to be inserted into the position h1, the data n−2, n−6, n−10 and n−14 to be inserted into the position h2, and the data n−1, n−5, n−9, n−13, n−17 and n−21 to be inserted into the position h3 are respectively written in their associated divided capacity segments, and further, the data n, n+1, n+2 and n+3 to be inserted into the positions ho, h1, h2 and h3 are successively written in. Following this, the data n, n−7, n−14 and n−21 at segments indicated by hatching in FIG. 8(A) are read out successively and are then inserted into the above positions ho, h1, h2, and h3. At this time, the addresses "0" through "15" are arranged within the memory 15 as indicated in FIG. 9(A). Accordingly, once the data at the segments indicated by hatching in FIG. 8(A) has been read out, the addresses "0", "1", "4" and "9" at the segments indicated by hatching in FIG. 9(A) become unnecessary.

In this connection, according to the system of the present invention, the unnecessary addresses "0", "1", "4" and "9", together with the other address, are rearranged as indicated in FIG. 9(B), and then the data n+4, n+5, n+6 and n+7 are successively written in as indicated in FIG. 8(B). Thereafter, specifying addresses "1", "2", "5" and "10" at the segments indicated by hatching in FIG. 9(B), the data n+4, n−3, n−10 and n−17 at the segments indicated by hatching in FIG. 8(B) are read out successively and are then inserted into the positions ho, h1, h2 and h3 in the following H period.

Thereafter, by repeating operations similar to the above, the interleaving operation can be carried out with an interleaving length of 2H. In the present embodiment, the relationship between data write-in address $A_{Wi}$ and read-out address $A_{Ri}$ (where i is 0, 1, 2 or 3) is expressed as follows in terms of the data at the positions ho, h1, h2 and h3, $$ho : A_{W0} = A \quad , A_{R0} = A \quad , A_{W0} - A_{R0} = 0$$

$$h1 : A_{W1} = A + 3 , A_{R1} = A + 1, A_{W1} - A_{R1} = 2$$

$$h2 : A_{W2} = A + 8 , A_{R2} = A + 4, A_{W2} - A_{R2} = 4$$

$$h3 : A_{W3} = A + 15, A_{R3} = A + 9, A_{W3} - A_{R3} = 6$$

where, A is 0 through 15.

Accordingly, since $A_{W0} - A_{R0} = 0$, the data having the same address is read out from the position ho. Moreover, since the data read out 2H, 4H and 6H earlier than the above data are inserted into the positions h1, h2 and h3, the delay relationship indicated in FIG. 6 is maintained constant, thus carrying out an interleave operation with D=2 and an interleaving length of 2H.

The control circuit 16 incorporates $2^N$ coded counters 28 and 30 the total memory capacity of which is equal the $2^N$ of the memory 15, adders 29 and 31, and a changeover switch SW5, as indicated in FIG. 10. The $2^N$ system counter 28 counts clock pulses $f_W$ for write-in, and the $2^N$ system counter 30 counts clock pulses $f_R$ for read-out. The output signal A of the $2^N$ system counter 28 is fed to the adder 29, where it is added with 1, 3, 8 and 15 in a cyclic manner, and the output signal A of the $2^N$ system counter 30 is fed to the adder 31, where it is added with 0, 1, 4 and 9 in a cyclic manner. As a result, desired interleaving is carried out so that the division points circulate through the memory 15 while maintaining constant the relationship among the length of the divided capacity segments: M0=1, M1=3, M2=5, and M3=7.

Figure 11:
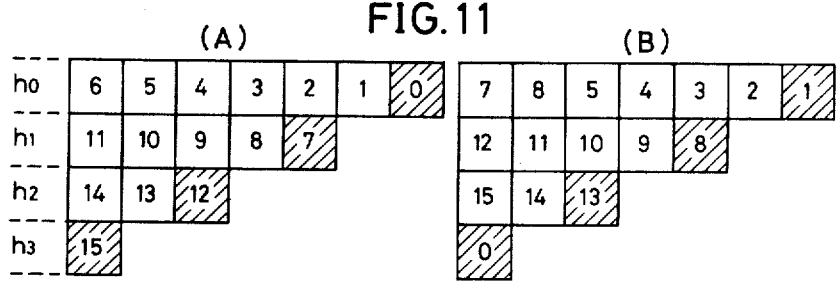
FIGS. 11(A) and 11(B) are diagrammatic views respectively showing one example of address change in the divided memory capacity segments of the system of the present invention, in deinterleaving.

Next, when deinterleaving the data interleaved as described above for restoring the original arrangement, the data located at the segments (indicated by hatching) designated by addresses "0", "7", "12" and "15" in FIG. 11(A) are read out, and the data located at the segments (indicated by hatching) designated by addresses "1", "8", "13" and "0" in FIG. 11(B) are read out. The segments designated by addresses "0", "7", "12", and "15" in FIG. 11(A) are thereafter used for writing in the insertion data. The relationship between data write-in address $A_{W'i}$ and data read-out address $A_{R'i}$ at the time of deinterleaving operation is expressed as follows in terms of the positions ho, h1, h2 and h3.

$$ho : A_{W'0} = A + 6, A_{R'0} = A \quad , A_{W'0} - A_{R'0} = 6$$

$$h1 : A_{W'1} = A + 11, A_{R'1} = A + 7, A_{W'1} - A_{R'1} = 4$$

$$h2 : A_{W'2} = A + 14, A_{R'2} = A + 12, A_{W'2} - A_{R'2} = 2$$

$$h3 : A_{W'3} = A + 15, A_{R'3} = A + 15, A_{W'3} - A_{R'3} = 0$$

Accordingly, the control circuit 22, which is of the same circuit organization as that indicated in FIG. 10, can carry out deinterleaving operation. Specifically, by addition of the specific value in the adders 29 and 31, the addresses (or division points) circulate through the memory 21 while maintaining constant the relationship between the length of the divided capacity segments so that the interleaved data can be restored to the original arrangement.

The above embodiment is described with respect to the case where the data read-out and write-in rate are equal to each other (where $f_W$ and $f_R$ designate, for example, horizontal scanning frequency). In this case, the $2^N$ system counter and the adder in a single loop are sufficient.

Even when the data read-out rate and write-in rate are different, it is best to carry out interleaving and deinterleaving operations. Moreover, the reproduced data is particularly affected by jitter or wow-flutter of the VTR and, therefore, a jitter correction memory is required for minimizing or eliminating the effect of this disadvantage.

Figure 12:
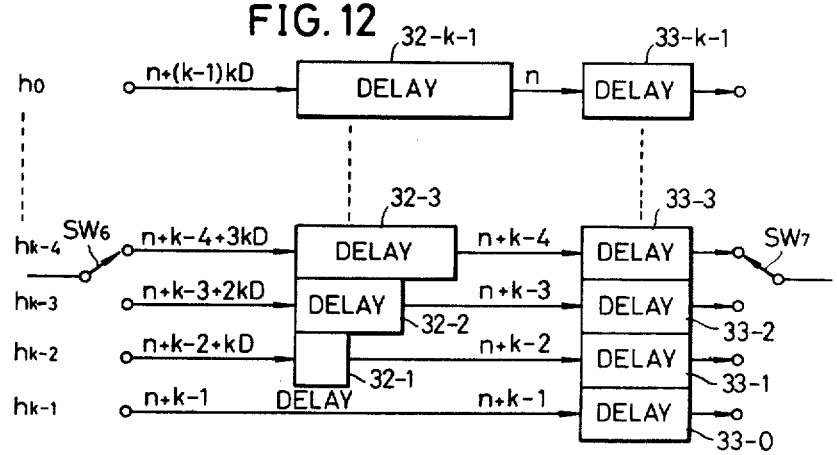
FIG. 12 is a circuit diagram of a basic delay circuit for concurrently carrying out deinterleaving and jitter elimination.

To meet the above mentioned needs, a delay circuit arrangement such as indicated in FIG. 12 may be used. Switches SW6 and SW7, both of which are changed over every specific sampling period and are connected to their associated k contact points, are respectively disposed at the input and output sides. Delay circuits 32-k—1, . . . , 32-3, 32-2 and 32-1 respectively having delay times (k−1)kD, . . . , 3kD, 2kD and kD are disposed in parallel connection between the input and output switches SW6 and SW7. The data n+(k−1)D·k reproduced from the position ho is delayed by means of the delay circuit 32-k−1, and the data n+k−2+kD reproduced from the position $h_{k-2}$ is similarly delayed by means of the delay circuit 32-1. The data n+k−1 reproduced from the position $h_{k-1}$ is delayed by means of a delay circuit 33-0 by a constant period of time and is then led out through the changeover switch SW7. AT a stage following the delay circuits 32-k−1, . . . , 32-3, 32-2, and 32-1, there are respectively provided delay circuits 33-k−1, . . . , 33-3, 33-2 and 33-1 in parallel connection. Each of these has a delay time which is the same as that in the delay circuit 33-0. In such circuit arrangement, it becomes possible to carry out deinterleaving operation and jitter correction.

In the system of the present invention, by adding the memory capacity α of a length corresponding to the delay time of the delay circuits 33-0 through 33-k−1 to the memory capacities Mo, M1, M2 and M3 of the memory divided as indicated in FIGS. 11(A) and 11(B), it is possible to realize a circuit arrangement equivalent to that indicated in FIG. 12. That is, when the total memory capacity of the memory 21 (which is the RAM) is increased from 16 (=$2^4$) to 32 (=$2^5$), α becomes 4 (words). Accordingly, each divided memory capacity segment becomes as follows: M0=11, M1=9, M2=7 and M3=5. The memory is thus divided in its memory capacity as indicated in FIG. 13.

Figure 13:
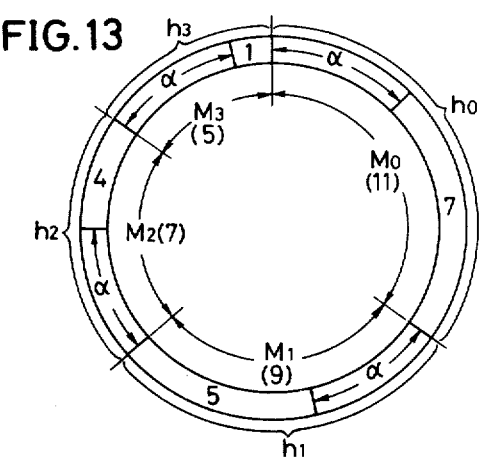
FIG. 13 is a diagrammatic view showing one example of division of memory capacity in concurrently carrying out deinterleaving and jitter elimination according to the system of the present invention.
Figures 14, 15:
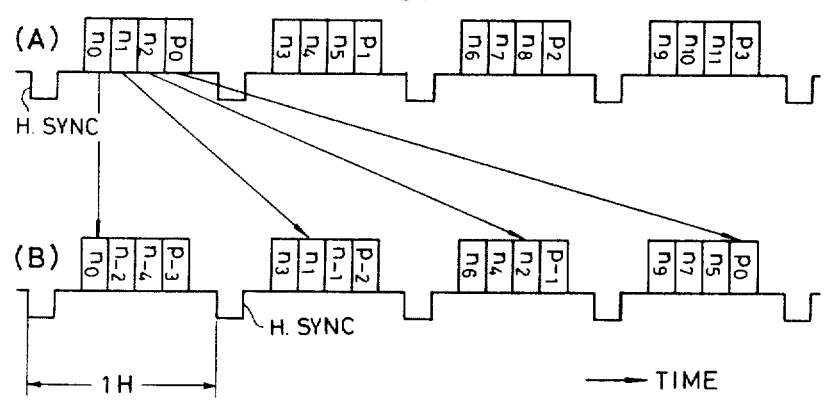
FIGS. 14(A) and 14(B) are diagrammatic views respectively showing one example of the address in the divided memory capacity segments in concurrently carrying out deinterleaving and jitter correction according to the system of the present invention as indicated in FIG. 13.
FIGS. 15(A) and 15(B) are model waveforms of signals in which the demodulated signals are superimposed on the composite synchronizing signals.

In the memory 21 having its memory capacity divided as indicated in FIG. 13, the relationship between each divided capacity segment and the data written in or read out therefrom becomes, as one embodiment, as indicated in FIGS. 14(A) and 14(B). When performing jitter correction concurrently with deinterleaving, the control circuit 22 assumes circuit organization as indicated in FIG. 10. In this circuit 22, the write-in clock pulse $f_W$ applied to the $2^N$ system counter 28 and the read-out clock pulse $f_R$ applied to the $2^N$ system counter 30 have different frequencies. The clock pulse $f_W$ includes the time base variation (jitter) which is the same as that contained in the reproduced data, while the clock pulse $f_R$ has better frequency stability and includes no jitter. The arrangement set forth above is the same as that described earlier. It is a feature of the present embodiment that the relationship between data write-in address $A_{W'i}$ and data read-out address $A_{R'i}$ is related or expressed as follows in terms of positions ho, h1, h2, and h3, $$ho : A_{W'0} = A + 10, A_{R'0} = A' + 1 \text{ (or } A' + 2)$$

$$h1 : A_{W'1} = A + 19, A_{R'1} = A' + 12 \text{ (or } A' + 13)$$

$$h2 : A_{W'2} = A + 26, A_{R'2} = A' + 21 \text{ (or } A' + 22)$$

$$h3 : A_{W'3} = A + 31, A_{R'3} = A' + 28 \text{ (or } A' + 29)$$

where A is the output of the $2^N$ system counter 28 for counting the pulse $f_W$, and A' is the output of the $2^N$ system counter 30 for counting the pulse $f_R$.

A and A' range from 0 (zero) to 31. When both A and A' are zero, the addresses are stored in the respective divided memory capacity segments as indicated in FIG. 14(A) and the decoder output and A are added together in the adder 29. Responsive to the added output, the reproduced data from the positions ho, h1, h2 and h3 are successively written in the memory capacity segments designated by addresses "10", "19", "26" and "31". On the other hand, the output A' of the $2^N$ system counter 30 and the decoder output are added in the adder 31. Responsive to the added output, the addresses "1", "12", "21" and "28" (or "2", "13", "22" and "29") are successively pointed out and the data written in the segments (indicated by hatching in FIG. 14(A)) designated by said addresses are successively read out.

When both A and A' are 1 (unity), the reproduced data from the positions ho, h1, h2 and h3 are, responsive to the output of the adder 29, written in the segments of the memory 21 successively in the order of addresses "11", "20", "27" and "0", as indicated in FIG. 14(B). Moreover, responsive to the output of the adder 31, the memorized data are successively read out from the memory segments (indicated by hatching) designated by addresses "2", "13", "22" and "29" (or "3", "14", "23" and "30") following this order. In FIGS. 14(A) and 14(B), the area surrounded by double full lines shows the memory capacity segments for jitter correction, and the remaining area surrounded by single full lines the memory capacity segments for deinterleaving.

In actuality, the rates at which A and A' undergo variation differ from each other, which means that the values of A and A' sometimes differ from each other in terms of time basis. However, the operation for carrying out deinterleaving and jitter correction concurrently can be achieved by the same memory 21, by applying a simple operation. Namely, in the adders 29 and 30, certain values are added successively so that the value of the logical subtraction of A and A' from each other (which value becomes 31 when $A=0$ and $A'=1$ in the present embodiment) falls inside the area surrounded by double full lines in FIGS. 14(A) and 14(B). More specifically, the special processing is carried out so that, when $A_{R''0}=A'+1$, $A_{R''1}=A'+12$, $A_{R''2}A'+21$ and $A_{r''3}=A'+28$, the above value of logical subtraction falls in either 30, 31, 0 or 1, and alternatively when $A_{R''0}=A'+2$, $A_{R''1}=A'+13$, $A_{R''2}=A'+22$ and $A_{r''3}=A'+29$, the logical subtraction results in either 31, 0, 1 or 2.

The description set forth above is given, for the sake of brevity, in connection with the instance where the number of data existing in 1H is four and the interleaving length D is 2H. The system of the present invention is, however, not limited to the above instance.

In the case where the data write-in address $A_{Wi}$ and the read-out address $A_{Ri}$ as indicated in FIGS. 9(A) and 9(B) undergo variation at the same rate and interleave with each other, the relationship between the two addresses is expressed by a general equation as follows $$\left. \begin{array}{l} A_{Wi} = A + i + \sum_{j=0}^{i} j \cdot D \\ A_{Ri} = A_{Wi} - i \cdot D \end{array} \right\} \quad (1)$$

where, $i=0$ through $k-1$.

When carrying out deinterleaving in the case where the write-in address and the read-out address undergo change at the same rate as indicated in FIGS. 11(A) and 11(B), the write-in address $A_{W'i}$ and the read-out address $A_{R'i}$ are expressed by the following general equation $$\left. \begin{array}{l} A_{W'i} = A + \sum_{j=0}^{i} (k-1-j)D + i \\ A_{R'i} = A_{W'i} - (k-1-i)D \end{array} \right\} \quad (2)$$

where, $i=0$ through $k-1$.

Furthermore, when concurrently carrying out deinterleaving and jitter correction of D (H) using the same memory in accordance with the system of the present invention, the write-in address $A_{W''i}$ and the read-out address $A_{R''i}$ are generally expressed by the following equations $$\left. \begin{array}{l} A_{W''i} = A + i + (i+1)\alpha + \sum_{j=0}^{i}(k-1-j)D \\ A_{R''i} = A' + i + (i+1)\alpha + \sum_{j=0}^{i}(k-1-j)D - \left\{ (k-1-i)D + \frac{\alpha}{2} \right\} \end{array} \right\} \quad (3)$$

where,
$\alpha$: length of memory for jitter correction, $i=0$ through $k-1$, and
$\alpha/2$: positive integer.

The memory (RAM) is controlled in such a manner that, when k data are time divided and multiplexed within 1H period, the data subjected to time division multiplexing at $i+1$th, that is, at the position ki, is written in the write-in address $A_{Wi}$, $A_{W'i}$ or $A_{W''i}$ expressed by the above equation (1), (2) or (3), and the data subjected to time division multiplexing at the position ki is read out from the read-out address $A_{Ri}$, $A_{R'i}$ or $A_{R''i}$. As a result, the memory operates similarly as in the case where the total memory capacity of the memory is divided into k memory capacity segments which have different memory capacities (lengths). Furthermore, the data write-in and read-out operation in and from the memory can be carried out as the division points circulate through the memory while maintaining constant the relationship of length of the divided memory capacity segments.

Accordingly, in the case where the number k of data present within the 1H period is set as the conventional one, it becomes possible to use a memory having a total memory capacity which is considerably smaller than that of the memory needed in the prior known system. While, in the case of using a memory having a total memory capacity equal to that of the conventional memory, it becomes possible to increase the number k of data which can be reasonably accommodated within 1H period over that can be accommodated in the prior known system. Furthermore, since the addresses are caused to circulate within the memory, a memory control system of a simple organization, such as that in the prior known system, is sufficient.

When recording and reproducing the above described digital signal with a VTR having a plurality of rotary heads for recording and/or reproducing the signal, there is a lack of the data in the digital signal at and in the vicinity of the part of the vertical synchronizing due to switching over of the rotary heads etc. In the reproduction mode, however, it is necessary to obtain the analog information continuously without loss. For this reason, the data is somewhat time compressed relative to the original analog signal. That is, the read-out rate and the write-in rate of the memories 15 and 21 are not exactly the same. The control system described in conjunction with FIG. 13 and FIGS. 14(A) and 14(B) can be preferably applied for time axis expansion as well as for correcting jitter due to time axis fluctuation of the VTR and for deinterleaving. Similarly, if memory capacity portions of equal length for use in time axis compression of data are added to the divided memory capacity segments indicated in FIG. 5, it becomes possible for the memory 15 to carry out the interleaving operation and time axis compressing operation of the data simultaneously. Furthermore, no trouble occurs even if more than two kinds of data are present at any of positions $h_0$ through $h_{k-1}$.

Next, a description is given of another embodiment of the system according to the invention with reference to FIGS. 15 through 18. In this embodiment, the digital signal has a pattern wherein each unit block signal exists together with the synchronizing signal, which unit block signal is composed of a plurality of signals wherein a modulated digital signal obtained by subjecting the analog signal to the digital signal processing of discontinuous level modulation system is divided every specific period, and the portions thus divided are arranged in an order different from the original order, and a correction signal. The above digital signal is recorded on the recording medium, and then the recording medium is reproduced. This embodiment relates to a system for controlling the memory which receives the above block signal among the reproduced digital signal.

This system is adapted to control the memory in such a manner that the plurality of modulated digital signals are restored to the original order, and simultaneously erroneous modulated digital signals are corrected using the above correction signal and the corrected data is again written in the original portion in the memory, the correction being carried out by reading out the data from the memory at a rate involving probable jitter.

FIG. 15(A) shows the waveform of a composite synchronizing signal in which the output data of the A/D converter 14 and the correction signal from the correction signal generator (provided at input or output side of the memory 15 but not shown) are combined as they are without change of order. In the same figure, $n_0$ denotes the data sampled the $n_0$th time and A/D converted, $n_1$, $n_2$, ..., $n_{11}$ similarly denote data respectively sampled at predetermined equal periods the second time, third time, ..., twelfth time from the $n_0$th time and A/D converted. P0, P1, P2 and P3 respectively denote the correction signal produced every predetermined period. Since the recording and reproducing apparatus adopts the interleaving system described above, the digital signal waveform indicated in FIG. 15(A) is not produced by alternatively the digital signal of arrangement as indicated in FIG. 15(B) is produced from the adder 18 and is then recorded by the VTR 19.

Referring to FIG. 15(B), three data and a single correction signal constitute each block, and the individual blocks are interposed between adjacent horizontal synchronizing signals. For instance, in 1H period at the leftmost position as viewed in the same figure, three exist, in time division multiplexing manner, a datum $n_0$, a datum $n_{-2}$ from two sampling period earlier than the datum $n_0$, a datum $n_{-4}$ from four sampling periods earlier than the datum $n_0$, and a correction signal $P_{-3}$ from among the correction signals Pi. The correction signals Pi are produced by a modulus 2 addition, as expressed by following equation.

$$Pi = n_{3i} \oplus n_{3i+1} \oplus n_{3i+2} \qquad (4)$$

Each datum is generally composed of 10 or more bits. The correction signal is utilized to restore a single datum among the data which are constituent elements of Pi, as will be described later.

In the recording and reproducing apparatus described above, since the reproduced digital signal includes time axis fluctuation therein due to jitter or wow-flutter of the VTR, the memory 21 has been required to perform jitter correction operation as well as deinterleaving operation, thus requiring memory capacity segments for deinterleaving and memory capacity segments for jitter correction.

When a single datum, for example, $n_{3i}$ among the constituent elements (data) $n_{3i}$, $n_{3i+1}$ and $n_{3i+2}$ of the correction signal Pi became erroneous due to dropout in the VTR 19, the datum $n_{3i}$ has been corrected and restored in the memory 21 based on other normal data $n_{3i+1}$, $n_{3i+2}$ and Pi, by applying them to the following equation of modulus 2 addition.

$$n_{3i} = n_{3i+1} \oplus n_{3i+2} \oplus Pi \qquad (5)$$

As another example, in the case where three data, that is, data $n_0$, $n_{-2}$ and $n_{-4}$ were erroneous in FIG. 15(B), these erroneous data have been corrected with modulus 2 addition as follows.

$$n_0 = n_1 \oplus n_2 \oplus P_0$$
$$n_{-2} = n_{-3} \oplus n_{-1} \oplus P_{-1} \qquad (6)$$
$$n_{-4} = n_{-6} \oplus n_{-5} \oplus P_{-2}$$

Specifically, according to the known memory control system, correction of error data by use of the signal Pi for correction has been carried out after elimination of jitter present in the reproduced data and the signal for reproduction correction. This means that memory capacity segments for jitter correction have been additionally required for correction signals in the memory 21.

For the sake of facilitating understanding, one example will now be discussed. It will be supposed that datum $n_{3i}$, $n_{3i+1}$ and $n_{3i+2}$ are successively read out from the memory capacity segments of the memory 21 at the time instants $t_{3i}$, $t_{3i+1}$ and $t_{3i+2}$. Simultaneously with this, the data $n_{3j}$, $n_{3j+1}$ and $n_{3j+2}$ to be read out at the succeeding time instants $t_{3j}$, $t_{3j+1}$ and $t_{3j+2}$ (where, $j=i+1$) are also read out. This read-out operation is generally referred to as "preceding read-out". If the erroneous datum among the data $n_{3j}$, $n_{3j+1}$ and $3_{3j+2}$ is $n_{3j+1}$, for example, addition with modulus 2 with respect to the data $n_{3j}$ and $n_{3j+2}$ and the correction signal Pj is carried out thereby to correct and restore the correct data $n_{3j+1}$. The data $n_{3j+1}$ thus restored is stored in a register additionally provided. Then, when reading out the data $n_{3j}$, $n_{3j+1}$ and $n_{3j+2}$ from the memory capacity segments for jitter correction in the memory 21 at the time instants $t_{3j}$, $t_{3j+1}$ and $t_{3j+2}$, as the data $n_{3j}$ and $n_{3j+2}$, the outputs from the memory 21 are used as they are, while, as the data $n_{3j+1}$, the output of the register is used, which output is the corrected data, that is, the modulated digital signal (generally, PCM signal). Therefore, this means that, as for the data $n_{3i}$, $n_{3i+1}$ and $n_{3i+2}$, corrected data has been stored in the above register at the time instants $t_{3h}$, $t_{3h+1}$ and $t_{3h+2}$ (where, $h=i-1$).

When making correction of error by the method described above, a memory for jitter correction is also required for the correction signal Pi.

FIG. 16 shows diagrammatically how the memory capacity of the memory 21 is used when controlled as described above. In the same figure, the total area denotes the total memory capacity of the memory 21. The total memory capacity is divided into four ($=2^2$) equal segments for writing in and reading out the data $n_{3i}$, $n_{3i+1}$ and $n_{3i+2}$, and the correction signal Pi. The divided segments all have the same capacity value (length). The area surrounded by double full line shows the memory capacity portion for correcting jitter.

The delay times, that is, the memory capacity values required for deinterleaving each of the data $n_{3i}$, $n_{3i+1}$ and $n_{3i+2}$ differ from each other. In this connection, according to the above described known control system, only the white rod-like part in FIG. 16 is used for deinterleaving data. The remaining unused part indicated by hatching is large and this is uneconomical. Moreover, with an increase in interleaving length, the memory part not used increases correspondingly. Furthermore, the need to allocate the jitter correcting memory capacity part for the correction signal Pi makes it necessary for the memory 21 to have rather large capacity. Particularly, when a plurality of correction signals is used, the predetermined jitter compensation capability cannot be attained unless additional memory capacity is provided.

The present embodiment eliminates the above described disadvantages and therefore affords effective utilization of the memory capacity.

FIG. 17 diagrammatically shows one embodiment indicating how the memory capacity of the memory is divided and the data is written in and read out, according to the system of the present invention. For the sake of description, the present embodiment is presumed to be arranged as follows: the total memory capacity of the memory is 32 ($=2^5$) words; the number m of the data existing within 1H period is three; the number k of elements constituting a single block composed of data and a correction signal is four; deinterleaving length D is 1H; and the memory is divided for usage into four memory capacity segments 34, 35, 36 and 37 respectively having memory capacity values (lengths) of 11, 10, 9 and 2; and the jitter correction memory capacity segments, shown surrounded by double full lines each has a length $\alpha$ ($\alpha=7$) within the divided memory capacity segments 34, 35, 36 and 37, as indicated in FIG. 17.

The present embodiment is arranged in such a manner that, in a system for reproducing a digital signal composed of blocks each of which is made up of data together with a correction signal, the memory capacity of the memory, such as a RAM, simultaneously carrying out deinterleaving of the reproduced data, error correction, and jitter compensation is divided into a plurality of memory capacity segments of a given length, and the write-in addresses and the read-out addresses for correction and for jitter compensation are caused to circulate through the plurality of divided memory capacity segments so as to satisfy the following equations. In such arrangement, it becomes possible to control the memory with a memory control system having an organization as simple as that of the conventional system, which memory has the minimum memory capacity required, and further to restrict reduction of jitter compensation capability to minimum.

That is, the write-in address $A_{Wi}$ is expressed as follows; when i=0 through (m−1), $$A_{Wi} = A + \sum_{j=0}^{i} (k - 1 - j) D + i + (i + 1)\alpha \tag{7}$$

when i=m through (k−1), $$A_{Wi} = A + \sum_{j=0}^{i} (k - 1 - j) D + i + m\alpha \tag{8}$$

The read-out address $A_{R'i}$ for correcting error is expressed as follows;
when i=0 through (m−1), $$A_{R'i} = A + \sum_{j=0}^{i} (k - 1 - j)D + i + (i + 1)\alpha - (k - 1 - i)D \tag{9}$$

when i=m through (k−1), $$A_{R'i} = A + \sum_{j=0}^{i} (k - 1 - j) D + i + m\alpha - (k - 1 - i) D \tag{10}$$

Accordingly, the read-out address $A_{Ri}$ for the data finally jitter compensated and read out is expressed as follows.

$$A_{Ri} = A' + \sum_{j=0}^{i} (k - 1 - j)D + i + (i + 1)\alpha - \left\{ (k - 1 - i)D + \frac{\alpha}{2} \right\} \tag{11}$$

In this equation, $\alpha/2$ is a positive integer. Moreover, in Eqs. (7) through (10), A is the output of the $2^N$ system counter 28 converted to an analogue value at the time the counter counts clock pulses having jitter. In Eq. (11), A' is the output of the $2^N$ system counter 30 converted to an analogue value at the time the counter counts the clock pulses without jitter.

Next, the operation of the above described embodiment is described in more detail, with reference to FIGS. 10 and 17. In FIG. 17, all memory capacity segments except the one segment indicated by hatching have the data written therein. A clock pulse $f_W$ which has the same time axis fluctuation (jitter) as that in the reproduced digital signal and has a frequency which is, for example, equal to the horizontal scanning frequency is applied to the $2^N$ system counter 28 which has a memory capacity equal to the total memory capacity $2^N$ of the memory 21. The counted output A of the $2^N$ system counter 28 is supplied to the adder 29, where it is added together with the signal from the decoder (not shown), as expressed by Eq (7). The output of the adder 29 is fed through the switch SW5 to the memory 21, where the data $n_{3(i+7)}$, $n_{3(i+6)+1}$ and $n_{3(i+5)+2}$ which have been multiplexed within 1H period are successively written in the divided memory capacity portions 34, 35 and 36, together with jitter contained therein, as indicated in FIG. 17. Following this, the adder 29 carries out the addition expressed by Eq. (8), and the resulting output causes the correction signal $P_{3(i+4)}$ to be written, together with the jitter therein, in the divided memory capacity portion 37.

During the time when the above described write-in operation is going on, the output A of the $2^N$ system counter 30 and the output of the decoder (not shown) are subjected to the adding operation expressed by Eq. (9) or (10) in the adder 31. The resulting output of the adder 31 passes through the switch SW5 now changed over and is applied to the memory 31. The data $n_{3(i+4)}$, $n_{3(i+4)+1}$, $n_{3(i+4)+2}$ and $P_{3(i+4)}$, each of which contains a jitter component, are thereby read out from the divided memory capacity segments 34, 35, 36 and 37 successively.

Accordingly, the operation of the memory 21 is controlled in the following order: write-in of datum $n_{3(i+7)}$, read-out of datum $n_{3(i+4)}$, write-in of datum $n_{3(i+6)+1}$, read-out of datum $n_{3(i+4)+1}$, write-in of datum $n_{3(i+5)+2}$, read-out of datum $n_{3(i+4)+2}$, write-in of correction signal $P_{3(i+4)}$, and read-out of correction signal $P_{3(i+4)}$.

Here, it is supposed that, among the jitter containing data $n_{3(i+4)}$, $n_{3(i+4)+1}$ and $n_{3(i+4)+2}$ read out, the datum $n_{3(i+4)}$, for example, is erroneous due to dropout. In this case, the datum $n_{3(i+4)}$ is corrected and restored through modulus 2 addition, expressed as follows.

$$n_{3(i+4)} = n_{3(i+4)+1} \oplus n_{3(i+4)+2} \oplus P_{3(i+4)} \qquad (12)$$

Thereafter, this jitter containing correction datum $n_{3(i+4)}$ is rewritten in the original address memory capacity portion 34 from which said data was read out.

The operation set forth above is carried out every 1H period. Accordingly, all the data such as $n_{3i}$, $n_{3i+1}$ and $n_{3i+2}$ existing in the jitter compensation memory capacity portion surrounded by double full lines are subjected to checking for error and are corrected. Therefore, the $2^N$ system counter 30 receives a stable oscillator output without any frequency fluctuation, as read-out clock pulse $f_R$. The resulting calculated output A' of the $2^N$ system counter 30 is supplied to the adder 31, where it is added with the decoder output in conformance with the aforementioned Eq. (11). The added output of the counter 30 is applied through the switch SW5 to the memory 21 as the signal for read-out. Therefore, data free from jitter and error are obtained from the jitter compensation memory capacity portion in the memory 21.

As described above, the present embodiment is arranged in a manner such that the data and the correction signal required for carrying out correction are read out at a rate including jitter and are then corrected, and the data thus corrected are rewritten in the original positions in the memory. Accordingly, from the jitter compensation memory capacity portion is read out error-free data, that is, the desired data.

Therefore, both the memory portion indicated by hatching inside the memory portion for compensating for correction signal jitter and the memory capacity portion indicated by hatching outside the memory portion for compensating for jitter, in FIG. 16, both of which have been required in the conventional system, become unnecessary. This means that, when a memory having the same total memory capacity as that of the conventional system is used, the length of the memory capacity portion for data jitter compensation can be made larger than in the conventional system, whereby reduction in jitter compensation capability due to the presence of a correction signal is effectively minimized. On the other hand, a jitter compensation capability equal to that of the conventional system can be realized with a memory of less capacity used together with a simple control system.

FIGS. 18(A) and 18(B) show how the addresses in the divided memory capacity segments undergo change, when A=0 and A'=0, and A=A'=1, respectively. In the present embodiment, the parameters have been supposed to be set as follows: D=1; m=3; k=4; and α=7. When A=0, the data are written in the memory segments designated by addresses "10", "20", "29" and "30", in accordance with Eqs. (7) and (9). Similarly, when A=1, the data are written in the memory segments designated by addresses "11", "21", "30" and "31", as illustrated in FIG. 18(B). The jitter compensated data are read out, when A'=0, from the addresses "4", "15" and "25" (alternatively, "3", "14" and "24") in FIG. 18(A) and, when A'=1, from the addresses "5", "16" and "26" (alternatively, "4", "15" and "25") in FIG. 18(B), in accordance with Eq. (11). In this manner, the addresses are caused to circulate through the memory, thus making it possible to reduce the total memory capacity of the memory with little or no increase in the complexity of the memory control system.

Further, this invention is not limited to these embodiments but various variations and modifications may be made without departing from the scope of the invention.

What is claimed is:

1. A memory control system comprising a memory supplied with an digital signal comprising a series of data; and a control circuit for producing a control signal to control said memory in such a manner that the total memory capacity of said memory is partitioned into a plurality (k) of memory capacity segments having given capacity values (lengths) which are different from each other, and said digital signal is written in datum by datum with an order and further the written-in digital signal is read out datum by datum with an order rearranged from the order with which the digital signal is written in, by means of circulating addresses through the plurality of divided memory capacity segments while maintaining the relationship in terms of capacity values (lengths) between the plurality of divided memory capacity segments to be constant.

2. A memory control system as claimed in claim 1 in which said control circuit controls write-in and read-out operations at the same rate while satisfying the following equations for write-in address Awi and read-out address Ari $$\left. \begin{array}{l} Awi = A + i + \sum_{j=0}^{i} j \cdot D \\ Ari = Awi - i \cdot D \end{array} \right\}$$

where,
i=0 through k−1,
D: interleaving length,
A: count of a counter for counting write-in clock pulses.

3. A memory control system as claimed in claim 2, in which said control circuit comprises: a first $2^N$ system counter for counting the write-in clock pulses for said memory; a first adder for adding the output signal of said first $2^N$ system counter and the output signal of a first decoder, the resulting added signal values being the write-in address values Awi for said memory; a second $2^N$ system counter for counting the read-out clock pulses for said memory; and a second adder for adding the output signal of said second $2^N$ system counter and the output signal of a second decoder, the resulting added signal values being the read-out address values Ari for said memory.

4. A memory control system comprising a memory supplied with a digital signal comprising a series of data arranged with an order which is different from its original order; and a control circuit for producing a control signal so as to control said memory in such a manner that the total memory capacity of said memory is partitioned into a plurality (k) of memory capacity segments having given values (lengths) which are different from each other, and said digital signal is written in datum by datum with the order which is different from its original order and further the written-in digital signal is read out datum by datum with the same order as the original order by means of circulating addresses through the plurality of divided memory capacity segments while maintaining the relationship in terms of capacity values (lengths) between the plurality of divided memory capacity segments to be constant.

5. A memory control system as claimed in claim 4 in which said control circuit controls write-in and read-out operations at the same rate with satisfying the following equations for write-in address Aw'i and read-out address Ar'i:

$$\left. \begin{array}{l} Aw'i = A + \sum_{j=0}^{i} (k - 1 - j)D + i \\ Ar'i = Aw'i - (k - 1 - i)D \end{array} \right\}$$

where, i = 0 through k − 1
D: interleaving length
A: count of a counter for counting write-in clock pulses.

6. A memory control system as claimed in claim 5 in which said control circuit comprises: a first $2^N$ system counter for counting the write-in clock pulses for said memory; a first adder for adding the output signal of said $2^N$ system counter and the output signal of a first decoder, the resulting added signal values being the write-in address values Aw'i for said memory; a second $2^N$ system counter for counting the read-out clock pulses for said memory; and a second adder for adding the output signal of a second decoder, the resulting added signal values being the read-out address values Ar'i for said memory.

7. A memory control system comprising a memory supplied with a digital signal comprising a series of data; and a control circuit for producing a control signal so as to control said memory in such a manner that the total memory capacity of said memory is partitioned into a plurality (k) of memory capacity segments having given values (lengths) which are different from each other, each of the plurality of memory capacity segments including therein a memory capacity part for time axis conversion, all the memory capacity parts having the same capacity value (length), and said digital signal is written-in datum by datum with an order in the divided memory capacity segments other than the memory capacity parts for time axis conversion, and further the written-in digital signal is read out datum by datum from the memory capacity parts for time axis conversion with an order rearranged from the order with which said digital signal is written in, by means of circulating addresses through the plurality of divided memory capacity segments while maintaining the relationship in terms of capacity values (lengths) between the plurality of divided memory capacity segments to be constant.

8. A memory control system comprising a memory supplied with a digital signal comprising a series of data arranged with an order which is different from its original order; and a control circuit for producing a control signal so as to control said memory in such a manner that the total memory capacity of said memory is partitioned into a plurality (k) of memory capacity segments having given values (lengths) which are different from each other, each of the plurality of memory capacity segments including therein a memory capacity parts for time axis conversion, all the memory capacity parts having the same capacity value (length), and said digital signal is written in datum by datum in the divided memory capacity segments other than the memory capacity parts for time axis conversion with the order which is different from its original order, and further the written-in digital signal is read out datum by datum from the memory capacity parts for time axis conversion with the same order as the original order by means of circulating addresses through the plurality of divided memory capacity segments while maintaining the relationship in terms of capacity values (lengths) between the plurality of divided memory capacity segments to be constant.

9. A memory control system comprising a memory supplied with a digital signal comprising a series of data arranged with an order which is different from its original order; and a control circuit for producing a control signal so as to control said memory in such a manner that the total memory capacity of said memory is partitioned into a plurality (k) of memory capacity segments having given values (lengths) which are different from each other, each of the plurality of memory capacity segments including therein a memory capacity part for time axis conversion and for compensation of time axis fluctuation, all the memory capacity parts having the same capacity value (length), and said digital signal is written in datum by datum in the divided memory capacity segments other than the memory capacity parts for time axis conversion and for compensation of time axis fluctuation with the order which is different from its original order, and further the written-in digital signal is read out datum by datum from the memory capacity parts for time axis conversion and for compensation of time axis fluctuation with the same order as the original order by means of circulating addresses through the plurality of divided memory capacity segments while maintaining the relationship in terms of capacity values (lengths) between the plurality of divided memory capacity segments to be constant.

10. A memory control system as claimed claim 9 in which said control circuit produces a control signal which satisfies the following equations for write-in address Aw''i and read-out address Ar''i of said memory:

$$\left. \begin{array}{l} Aw''i = A + i + (i + 1)\alpha + \sum_{j=0}^{i} (k - 1 - j)D \\ Ar''i = A' + i + (i + 1)\alpha + \sum_{j=0}^{i} (k - 1 - j)D - \left( (k - 1 - j)D + \frac{\alpha}{2} \right) \end{array} \right\}$$

where,

α: length of said memory capacity parts for time axis conversion and for compensation of time axis fluctuation,
i=0 through k−1,
α/2: positive integer,
D: interleaving length,
A: count of a counter for counting write-in clock pulses,
A': count of a counter for counting read-out clock pulses.

11. A memory control system as claimed in claim 10 in which said control circuit comprises: a first $2^N$ system counter for counting write-in clock pulses which have the same time axis fluctuation as that in the digital signal supplied to said memory; a first adder for adding the output signal of said first $2^N$ system counter and the output signal of a first decoder, the resulting added signal values being the write-in address value Aw"i for said memory; a second $2^N$ system counter for counting read-out clock pulses which are free from the time axis fluctuation; and a second adder for adding the output signal of said second $2^N$ system counter and the output signal of a second decoder, the resulting added signal values being the read-out address value Ar"i for said memory.

12. A memory control system comprising a memory supplied with a digital signal composed of a series of blocks, each of which comprises elements of a predetermined number of data arranged with an order which is different from its original order and an element of a correction signal formed from the predetermined number of data which are arranged with the original order; and a control circuit for producing a control signal so as to control said memory in such a manner that the total memory capacity of said memory is partitioned into a plurality of memory capacity segments having given values (lengths) which are different from each other, all of the plurality of memory capacity segments other than the memory capacity segments for said correction signal including therein memory capacity parts for compensating for time axis fluctuation, all said parts having the same capacity value (length), and said digital signal is written in element by element in the divided memory capacity segments other than the memory capacity parts for compensating for time axis fluctuation with the order which is different its original order and further the written-in digital signal is read out element by element at a rate in synchronism with the time axis fluctuation from the divided memory capacity segments other than the memory capacity parts for compensating for time axis fluctuation with the same order as the original order thereby to correct any erroneous datum by using the read-out correction signal, any datum thus corrected is again written in in the divided memory capacity segment from which said any erroneous datum has been read out, and the error-free data and any datum which has been read out and rewritten are read out datum by datum from the memory capacity parts for compensating for time axis fluctuation with the same order as the original order, by means of circulating addresses through the plurality of divided memory capacity segments while maintaining the relationship in terms of capacity values (lengths) between the plurality of divided memory capacity segments to be constant.

13. A memory control system as claimed in claim 12 in which said control circuit produces the control signal for controlling said memory in such a manner that the write-in of the elements of a predetermined number of data which are arranged with an order which is different from its original order and the element of a correction signal in each of the divided memory capacity segments other than the memory capacity parts for compensating for time axis fluctuation, is carried out by specifying an address Awi which satisfies the following equations when i=0 through (m−1), $$Awi = A + \sum_{j=0}^{i} (k - 1 - j)D + i + (i + 1)\alpha$$

when i=m through (k−1)

$$Awi = A + \sum_{j=0}^{i} (k - 1 - j)D + i + m\alpha.$$

(where D is interleaving length, α is length of the memory capacity part for compensating for time axis fluctuation, m is a number of data in each block, and A is the calculated value of a counter for counting clock pulses for write-in), operation for reading out said correction signal is carried out by specifying an address Ar'i which satisfies the following equations, when i=0 through (m−1), $$Ar'i = A + \sum_{j=0}^{i} (k - 1 - j)D + i + (i + 1)\alpha - (k - 1 - i)D$$

when i=m through (k−1), $$Ar'i = A + \sum_{j=0}^{i} (k - 1 - j)D + i + m\alpha - (k - 1 - i)D$$

and, read out of data from each of said memory capacity parts for compensating for time axis fluctuation is carried out by specifying an address Ari which satisfies the following equation, $$Ari = A' + \sum_{j=0}^{i} (k - 1 - j)D +$$

$$i + (i + 1)\alpha - \left( (k - 1 - i)D + \frac{\alpha}{2} \right)$$

(where, A' is the count of a counter for counting clock pulses for read-out, and α/2 is a positive integer).

14. A memory control system as claimed in claim 1 or 7 in which said digital signal supplied to said memory is a modulated digital signal which is formed by subjecting an analog signal to digital signal processing of discontinuous level modulation system.

15. A memory control system as claimed in claim 4, 8, 9 or 12 in which said digital signal supplied to said memory is a digital signal, the data of which have been arranged with an order different from an original order of data of a modulated digital signal which is formed by subjecting an analog signal to digital signal processing of discontinuous level modulation system, and have passed through a transmission system.

* * * * *